United States Patent [19]
Nelson

[11] Patent Number: 4,542,520
[45] Date of Patent: Sep. 17, 1985

[54] X-RAY DETERMINATION OF PARTS ALIGNMENT

[75] Inventor: Charles W. Nelson, Boulder, Colo.

[73] Assignee: The United States of America as represented by the Administrator of the National Aeronautics and Space Administration of General Counsel-Code GP, Washington, D.C.

[21] Appl. No.: 438,446

[22] Filed: Nov. 2, 1982

[51] Int. Cl.[4] ............................................ G03B 41/16
[52] U.S. Cl. ........................................ 378/58; 378/59
[58] Field of Search ..................................... 378/58, 59

[56] References Cited

U.S. PATENT DOCUMENTS 2,396,069  3/1946  Zapp ..................................... 378/59
3,536,915 10/1970  Dyer ..................................... 378/58

Primary Examiner—Craig E. Church
Attorney, Agent, or Firm—Russell E. Schlorff; John R. Manning; Marvin F. Matthews

[57] ABSTRACT

A method for determining the alignment of adjoining metal objects is provided. The method comprises producing an X-ray image of adjoining surfaces of the two metal objects, the X-ray beam being tangential to the point the surfaces are joined. The method is particularly applicable where the alignment of the two metal objects is not readily susceptible to visual inspection.

2 Claims, 3 Drawing Figures

X-RAY DETERMINATION OF PARTS ALIGNMENT

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; U.S.C. 2457).

TECHNICAL FIELD

This invention pertains to a method for determining the alignment of adjoining metal objects or parts. More specifically, this invention pertains to a method for using X-ray or radiographic photography to determine the alignment of adjoining metal parts, particularly when said parts are rigidly joined, such as by means of a weld, and particularly where the joint is not conveniently susceptible to visual inspection and/or measurement.

BACKGROUND ART

Liquid hydrogen and liquid oxygen are carried on board the Space Shuttle during its orbital flights. The specially designed tanks consist of an inner sphere supported inside an outer sphere. The inner sphere is fabricated from two precisely formed hemispheres. The hemispheres are dimensionally inspected, fitted into a weld fixture, positioned for welding, inspected and adjusted for alignment or mismatch and then welded together. The outer sphere also consists of two hemispheres. When assembled, the inner sphere is supported inside the outer sphere with the space between the inner and outer spheres being filled with appropriate insulation material and evacuated. The two outer hemispheres are also joined by welding and a girth ring attached which, among other things, facilitates handling of the total pressure vessel assembly. While the match of the two inner hemispheres are visually checked prior to welding, it at times became advisable to recheck the alignment, or possible mismatch, of the two inner hemispheres after total assembly. Disassembling the total structure would have been prohibitive both as to time and cost.

X-ray or radiographic inspections of metal objects is well known in the art. The usual purpose of such inspections is to determine the existence of any abnormalities in the composition of the object which would detract from its utility. An example of such use of X-rays is in the inspection of welds used to join two metal parts such as pipes or in the fabrication of pressure vessels. X-rays of the weld itself permit the determination of the existence of any imperfections in the weld, such as air blisters, which would impair the strength or integrity of the weld. U.S. Pat. No. 3,087,058 is a particular illustration of this technique.

It is an object of this invention to provide a method for accurately determining the alignment of adjoining metal parts, particularly metal parts that have been joined together by a weld or other suitable means and where visual inspection is either impractical or impossible. Other objects will become apparent from the description of the invention.

BRIEF STATEMENT OF THE INVENTION

According to this invention, a method for determining the alignment of adjoining metal parts is provided which comprises producing an X-ray image of a cross section of the adjoining metal parts depicting, directly or indirectly, the position of a surface of each of the metal parts at the point said surfaces are to be joined in particular alignment. In producing the X-ray image in accordance with this invention, the center ray of the X-ray beam used to produce the X-ray image is maintained tangential to the point said surfaces are joined and perpendicular to the plane of said cross section and the plane of the X-ray film on which the X-ray image is produced. The method of this invention is particularly useful in determining the position of metal objects with respect to each other when ordinary visual determination of said position is hampered, such as in the case of the two metal objects being disposed within another object or the point of position in question being obscured, such as by insulation.

DESCRIPTION OF A PREFERRED EMBODIMENT

The practice of this invention will be described in connection with determining the alignment or mismatch in a liquid hydrogen pressure vessel carried on board the Space Shuttle.

The hydrogen tank is an aluminum sphere having a wall thickness of approximately 3 mm. and an inside diameter of approximately one meter. The sphere is fabricated from two hemispheres. The hemispheres are fitted into a weld fixture, positioned for welding and welded.

The spherical hydrogen tank is supported inside an outer sphere. The outer sphere is aluminum having an inside diameter approximately 10 cm. greater than that of the inner sphere. The outer sphere is also fabricated from two hemispheres welded together. The void between the two spheres is filled with insulation and evacuated.

Figure 1:
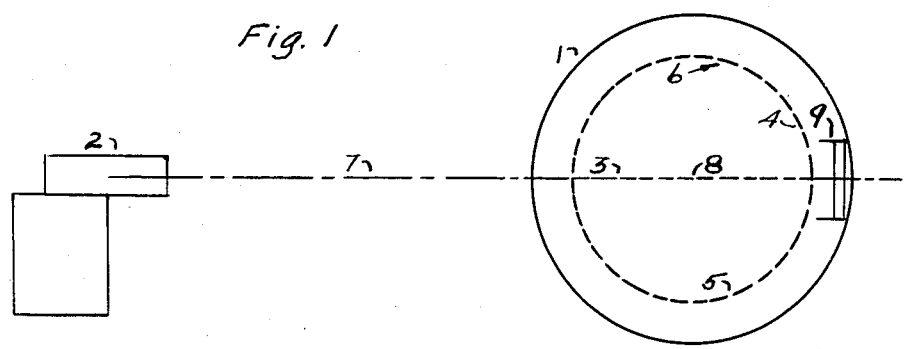
FIG. 1 is a schematic representation of the arrangement to produce an X-ray image to depict or determine the alignment of two hemispheres welded to form a sphere supported inside an outer sphere.
Figure 2:
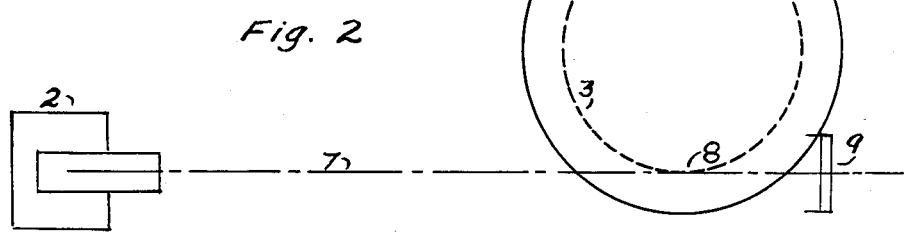
FIG. 2 is a top view of FIG. 1.

To check the alignment or possible mismatch in the two inner hemispheres of the assembled unit, reference is made to FIGS. 1 and 2. The assembled unit was supported and stabilized to prevent movement. For clarity purposes, the girth ring and line of juncture for the two hemispheres of outer sphere 1 is not shown. The X-ray source 2 was positioned level with the weld line 3 joining the upper 4 hemisphere and lower 5 hemisphere of inner sphere 6 and further positioned so that the center ray 7 of the X-ray beam touches the tangent point 8 on the weld line 3 to be checked. The X-ray film in a film holder 9 is positioned as close as possible to the outside of outer sphere 1, squared to be perpendicular to the center ray 7 of the X-ray beam passing through tangent point 8. The X-ray source 2 was positioned approximately 3.5 meters from the tangent point 8, the film holder 9 positioned approximately 31 cm. from the tangent point 8.

The X-ray source 2 was operated at 260 kilovolts and 9.5 milliamps for a 4 minute exposure on Kodak Industrex M film.

Figure 3:
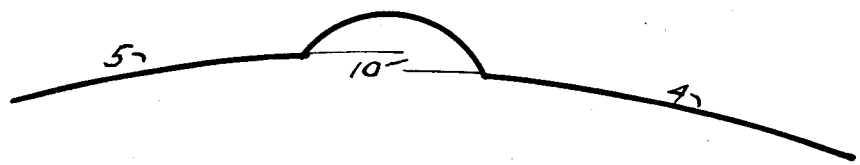
FIG. 3 is a reproduction of the pertinent portion of an X-ray image (not to scale) of a cross section of the two inner hemispheres at a point at which they are joined, the X-ray image depicting a mismatch.

FIG. 3 illustrates that portion of an X-ray image obtained depicting a mismatch between the lower 5 and upper 4 hemispheres of inner sphere 6. The extent of the mismatch is indicated by gap 10.

The description of the preferred embodiment of this invention and the X-ray image produced illustrates two very important features or advantages of the novel method of this invention. First, the method permits determining the alignment of adjoining metal objects or parts where visual inspection would be costly, impractical or impossible. To visually check the alignment of the two hemispheres of the inner sphere in the instant case would require cutting apart and removing the two hemispheres of the outer sphere and removing the insulation between the two spheres. This would obviously be a costly procedure and a totally unnecessary expense should the degree of any non-alignment be found to be acceptable. Second, the X-ray image illustrates how it can be used to determine non-alignment even though the exact point of juncture of the two surfaces intended to be aligned is not directly visible on the X-ray image. In the case described, the weld itself prevents the X-ray image from showing the precise juncture of the two surfaces to be aligned. However, extending the surface lines in the X-ray image, indirectly the image readily and clearly reflects a non-alignment and its extent.

Conventional, readily available, X-ray equipment can be used in the practice of this invention. Five general rules should be followed to obtain maximum and accurate definition of the alignment of surfaces or objects under consideration. First, the source of X-rays should be small, that is, as nearly a point as can be obtained. As the source of X-rays increases in size, the sharpness or delineation of the object being X-rayed decreases. Second, the distance between the X-ray source and the object being X-rayed should be as extended as possible. At extended distances, definition is improved and the X-ray image approaches actual size. Third, the X-ray film should be as close to the X-rayed object as possible. This, too, promotes obtaining an image approaching actual size. Fourth, the central ray of the X-ray beam should be substantially perpendicular to the plane of the X-ray film to preserve or accurately reproduce spatial relations. Fifth, the plane of the film should be parallel to the plane of maximum interest in the object being X-rayed, again to preserve spatial relationships.

In some instances, it is of interest to determine merely whether a non-alignment exists. In others, the extent of non-alignment can be of interest. In this latter case, and assuming a nearly point source of X-rays, the extent of non-alignment can be determined from a measurement of non-alignment on the X-ray image, adjusted for the degree of enlargement in the X-ray image. The degree of enlargement is represented by the equation:

$$(S_o/S_i) = (D_o/D_i)$$

where $S_o$ is the size of the object, $S_i$ is the size of the X-ray image, $D_o$ is the distance from the X-ray source to the object and $D_i$ is the distance of the X-ray source to the recording X-ray film.

The practice of this invention has been described in connection with the determination of alignment of objects wherein the adjoining surfaces are curved or spherical (curvilinear) facilitating X-raying through a tangent point at the juncture of the two surfaces. This invention is not limited to such objects as it can also be applied to objects that have adjoining rectilinear surfaces. With such objects, the tangent point becomes a corner where the surfaces to be aligned meet permitting producing an X-ray image of surfaces to be aligned without interference from the body of the objects being joined.

It is also to be noted that X-raying through a tangent point permits a clear delineation of one of the surfaces of each of the two objects to be aligned and this is all that is necessary to determine alignment. In the preferred embodiment described above, the X-ray image sharply depicts only the line of the outer surface of each of the two hemispheres at the tangent point. The line of the inner surface of each of the two hemispheres at the tangent point is poorly defined, if at all, due to the shadow effect of interfering portions of the inner hemisphere in line with the inner surface.

While the invention has been described in connection with a particular aerospace application, its utility is not so limited. It has utility in many industrial applications. For example, heavily insulated pipelines made up of sections of pipe welded together are rather common. Concern for safety frequently requires periodic checking to confirm the continued integrity of installation. The method of this invention permits checking the alignment of surfaces at the weld joint without the removal and reinstallation of insulation. Similarly, many chemical reaction vessels are equipped with cooling jackets. The method of this invention permits inspection of the inner wall of the jacket without dismantling or even without interrupting use of the vessel.

What is claimed is:

1. A method for the inspection of a thin walled pressure vessel, formed of an inner and an outer sphere each sphere comprised of a pair of hemispheres welded together around their girths, to accurately determine any mismatch of the hemispheres of the inner sphere, said method comprising:
    positioning and supporting the pressure vessel to be examined to prevent movement;
    locating a point source of X-rays at an extended distance from the pressure vessel and level with the weld line of the inner sphere with the center ray of the X-ray touching the tangent point of the weld line;
    positioning the X-ray film adjacent to the outside of the outer sphere, the extended distance of the X-ray source and the close distance of the X-ray film producing an X-ray image approaching actual size;
    squaring the film to be substantially perpendicular to the center ray of the X-ray beam passing through the tangent point and substantially parallel to the plane of maximum interest of the inner sphere to preserve the spatial relationship; and
    extending at least one surface of the produced image of the two curvilinear structures whereby the extent of non-alignment can be determined from the gap between the two surfaces.

2. The method specified in claim 1 wherein the amount of misalignment is adjusted from the degree of enlargement in the X-ray image, enlargement being represented by the equation:
    $$(S_o/S_i) = (D_o/D_i)$$

where $S_o$ is the size of the object, $S_i$ is the size of the X-ray image, $D_o$ is the distance from the X-ray source to the object and $D_i$ is the distance of the X-ray source to the X-ray film.

* * * * *